Dec. 24, 1957  R. T. FIELDS  2,817,113
EXTRUDER ASSEMBLY FOR EXTRUSION OF TETRAFLUOROETHYLENE POLYMER TUBES
Filed Sept. 15, 1954

INVENTOR
REUBEN T. FIELDS
BY
ATTORNEY

United States Patent Office 2,817,113
Patented Dec. 24, 1957

2,817,113

EXTRUDER ASSEMBLY FOR EXTRUSION OF TETRAFLUOROETHYLENE POLYMER TUBES

Reuben Thomas Fields, Wilmington, Del., assignor to E. I. du Pont de Nemours and Company, Wilmington, Del., a corporation of Delaware Application September 15, 1954, Serial No. 456,142

1 Claim. (Cl. 18—14)

This invention relates to a device for forming improved tubing from tetrafluoroethylene polymer and more particularly relates to an improved spider used in the tube extrusion of tetrafluoroethylene polymer.

It is well known that polytetrafluoroethylene is difficult to fabricate into various shapes by techniques applicable to most other plastics. Special techniques have been developed and are known to those skilled in the art that make the fabrication of polytetrafluoroethylene possible. These techniques are in general based on two properties of the polymer. The low hardness of the polymer makes it possible to form the polymer powder into a solid preform having the shape of the desired article. This is followed by sintering the material above its melting point to give a strong article. The extremely high melt viscosity of the polymer prevents any major change of shape during the sintering operation. This process of manufacturing articles is described in greater detail in U. S. Patent 2,400,099.

For the extrusion of polytetrafluoroethylene into continuous shapes such as rods, beading, tubes, and pipes, a preferred method is to use a lubricated polymer powder composition such as described in U. S. Patents 2,593,582 and 2,685,707. The lubricant is added to the polymer to aid in the deformation of the polymer particles, so as to obtain a solid preform. Because of the high pressures needed, ram extruders are preferred in the process of this invention. As in the continuous extrusion of other plastic tubing the extrusion of the polytetrafluoroethylene pipe preform requires a sleeve and a core therein in order to form the polymer powder into a pipe. The core is supported at the inlet end of the sleeve by a spider which is so constructed as to prevent the core from deflecting from the center of the pipe and thus give a pipe with even thickness. The shape of this spider in the general extrusion of plastic pipe is not very important with regard to the plastic being extruded, since most plastic materials are extruded above their melting temperature so that on passing through the spider the material is rewelded and no evidence of passing through the spider is found in the extruded product. In the extrusion of tetrafluoroethylene polymer by the hereinabove mentioned method, however, the shape of the spider becomes of great importance, as the polymer, extruded far below its melting point, will reweld only with difficulty to give a strong preform. As the polymer powder is already compacted and under pressure when entering the spider, the polymer tends to form a seam when leaving the spider. The same problem is encountered in the extrusion of tetrafluoroethylene polymer above its sintering temperature since the polymer will not weld with ease in the molten stage because of its high melt viscosity. For these reasons the spider used in the extrusion of polytetrafluoroethylene consists of number of radial fins attached to a stem which in turn is attached to the core. The fins are made as thin as the strength of the material will permit without detracting from the primary objective of the spider, namely to keep the core suspended and centered. The extruded pipe preform will have a number of radial seams in it corresponding to the number of fins used in the spider. These seams must be strong enough to withstand the drying and sintering operations that follow the extrusion step. Due to the thermal expansion of the polymer and the poor strength of the radial seam, cracks and splits occur occasionally in the pipe at the seams in the aforesaid two processes. These cracks are often not detectable during the manufacture of the pipe and may cause failure during usage, which is expensive and hazardous.

It is therefore an objective of this invention to extrude stronger, unsintered pipe preforms from polytetrafluoroethylene. Another object of this invention is to make flawless sintered tubing from polytetrafluoroethylene powder with uniform, high strength throughout the circumference of the tubing.

According to this invention, tubing of polytetrafluoroethylene having greater strength in the preformed unsintered stage as well as in the sintered stage is obtained if flutes are introduced into the lower ends of the fins supporting the core in the sleeve of the extrusion die thereby creating non-radial seams in the extruded tubing.

The non-radial seams in the unsintered tubing will give rise to a stronger bond in the sintering operation as the strains due to the thermal expansion of the polytetrafluoroethylene will not rupture the seams whereas in radial seams the forces of the thermal expansion of the polymer will tend to pull the seam apart giving rise to splits and cracks.

This invention is further illustrated with reference to the accompanying drawings in which Figure 1 is the cross sectional view of the lower section of a ram extruder showing the cylinder, the piston and the extrusion die with the core therein held in position by the spider.

Figure 1:
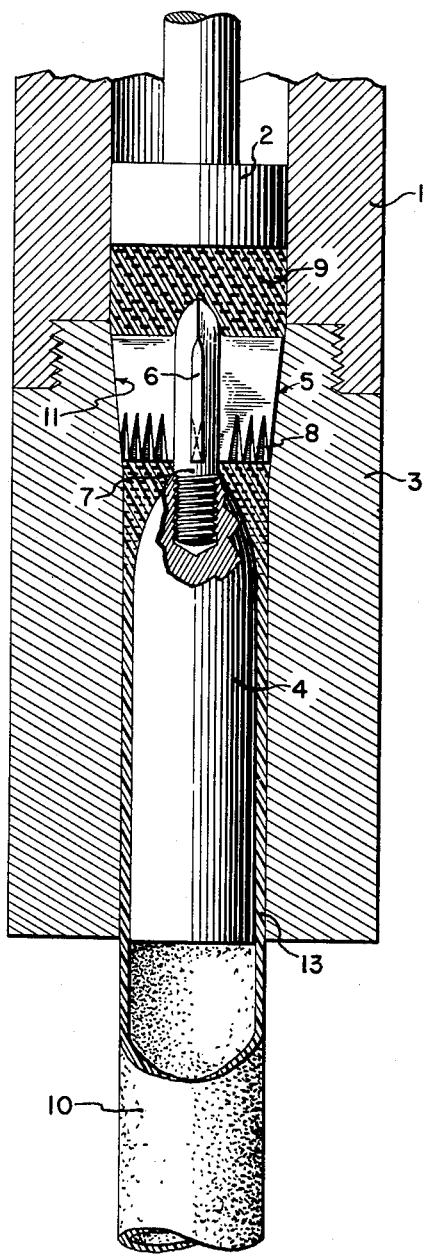
Figure 5:
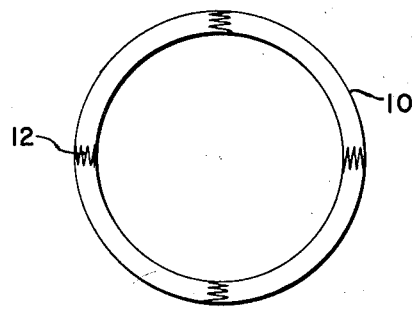
Figure 5 is the cross sectional view of a polytetrafluoroethylene pipe preform showing the resulting seam having increased strength.

As shown in Figure 1 of the drawings, the lubricated tetrafluoroethylene polymer powder 9 is forced by the piston 2 of the ram extruder 1, shown here only in part, into the extrusion die 3. The polymer powder is forced by the pressure of the ram through the spider 5 and is compacted in the tapered upper end of the die 11 containing the spider 5. The flutes 8 on the end of each side of each fin 6 result in seams in the tubing preform as illustrated in Figure 5. Upon passing through the fins 6 the polymer is forced into the space between the sleeve of the die 13 and the core 4 so that on leaving the die the polymer is shaped into a pipe 10 consisting of highly compressed adhering particles of tetrafluoroethylene polymer and lubricant. Although the seams are still present in the preform as illustrated by the seams 12 in Figure 5 they are no longer radial as would be obtained by using unfluted fins but greatly increased in length and non-radial, thus imparting increased strength to the seam. The preformed pipe obtained from this extrusion is then heated to remove the lubricant and sintered in separate operations not shown in the drawings since they are of prior art nature and known to those skilled in the art.

In the sintered pipe obtained from the extrusion process of this invention the seams are no longer readily discernible. Tensile strength measurements of samples of sintered pipe are the same in both vertical and horizontal directions indicating the flawlessness of the pipe.

Figure 2:
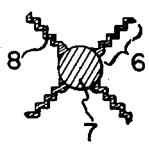
Figures 2 and 3 show the lower edges of the fins of two types of spiders usable in this extrusion apparatus.
Figure 3:
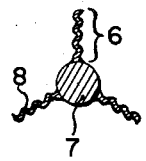

In Figures 2 and 3 are shown cross sectional views of the lower edges of two types of spiders used in the process of extruding polytetrafluoroethylene pipe, clearly indicating the edge effect of the flutes 8 on the fins 6 which are attached to the stem of the spider 7 which in turn is attached to the core. The flutes may be triangular in nature as shown in Figure 2 or from a corrugated edge as shown in Figure 3 without departing from the spirit of this invention of obtaining a non-radial seam in the preformed pipe.

Figure 4:
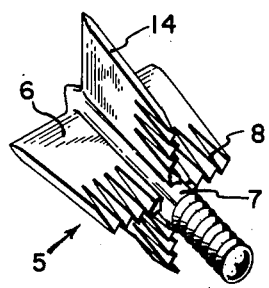
Figure 4 is the enlarged side view of one of the fins of the spider containing the flutes of this invention.

In Figure 4 the enlarged side view of the fins containing triangular flutes is shown. The fin 6 is equipped with a tapered surface 14 at the outer edge so as to fit in the seat 11 of the extrusion die and thus keep the core concentric with the sleeve as illustrated in Figure 1. The flutes 8 are cut into the fin in such a manner as to create a triangular ragged edge effect at the lower end of the fin 6 as illustrated in Figure 2. Since it is the object of this invention to create a non-radial seam the length of the flutes and the number of the flutes may be varied without departing from the scope of this invention. It is preferred to use many flutes since then the angles formed by the edge will be steep with regard to the radial direction, thus increasing the strength of the seam. The depth of the flute should increase gradually, leading up to the formation of the serrated edge so as to facilitate the formation of a non-radial seam. The depth of the flutes will depend on the thickness of the fins. The depth of the flute should be the maximum possible so as to increase the width of the seam, thus providing larger bonding area.

From the foregoing it will be apparent that the present invention is applicable to all types of tetrafluoroethylene polymer used in the extrusion of tubing below the sintering temperature of the polymer and for reason outlined hereinabove also for extrusions above the sintering temperature of the polymer. Furthermore, the present invention is not limited to size or thickness of the polytetrafluoroethylene pipes or tubing produced. Having thus described the present invention it will be understood that details may be changed without departing from the scope of this invention.

I claim:

An extruder assembly for extruding polytetrafluoroethylene which comprises a source of polytetrafluoroethylene powder under pressure, a die and core defining an annular space, said die having a feed zone adjacent to said source and a forming zone removed from said source by said feed zone, said die having a gradually decreasing diameter in the direction of polymer flow in said feed zone and a constant diameter in the said forming zone, said core having also a constant diameter throughout that part of the forming zone which is adjacent to the said extrusion orifice, said core being rigidly held in place by a spider in said feed zone, said spider comprising radial fins on a central stem, said fins having peripheral edges tapered to fit the die in the said feed zone, each of said fins having a continuous single serrated edge facing in the direction of said orifice formed by triangular flutes of gradually increasing width and depth in the direction of polytetrafluoroethylene flow, said serrated edge being further characterized in that the serration is in a plane perpendicular to said central stem.

References Cited in the file of this patent

UNITED STATES PATENTS

| | | |
|---|---|---|
| 1,679,545 | Roth | Aug. 7, 1928 |
| 2,363,261 | Ritter | Nov. 21, 1944 |
| 2,392,190 | Ritter | Jan. 1, 1946 |